United States Patent [19]
Moschetti et al.

[11] 4,383,958
[45] May 17, 1983

[54] METHOD OF PRODUCING DENSE SILICON NITRIDE CERAMIC ARTICLES HAVING CONTROLLED SURFACE LAYER COMPOSITION

[75] Inventors: Anthony P. Moschetti; J. Thomas Smith; Carr L. W. Quackenbush, all of Acton; Helmut Lingertat, Dorchester, all of Mass.; Vincent W. Nehring, Stillwater, Minn.

[73] Assignee: GTE Laboratories Incorporated, Waltham, Mass.

[21] Appl. No.: 333,235

[22] Filed: Dec. 21, 1981

[51] Int. Cl.$^3$ ............................................. C04B 35/58
[52] U.S. Cl. .................................... 264/65; 264/325; 264/332; 428/332; 501/98; 501/152
[58] Field of Search ......................... 264/325, 332, 65; 501/98

[56] References Cited

U.S. PATENT DOCUMENTS

| | | | |
|---|---|---|---|
| 4,234,343 | 11/1980 | Anderson | 501/98 |
| 4,285,895 | 8/1981 | Mangels et al. | 264/325 X |
| 4,310,499 | 1/1982 | Mitomo et al. | 264/65 X |
| 4,323,325 | 4/1982 | Samanta et al. | 501/98 X |
| 4,356,136 | 10/1982 | Mangels | 264/65 |

Primary Examiner—Helen M. McCarthy
Attorney, Agent, or Firm—Jerry F. Janssen

[57] ABSTRACT

Dense, composite, polycrystalline ceramic articles comprising silicon nitride, silicon dioxide, and yttrium oxide and having thin surface layers of controlled composition are formed by sintering pre-pressed compacts embedded in setter bed powder mixtures having compositions of silicon nitride, silicon dioxide, and yttrium oxide which differ from that of the pressed compact.

Employing the method of this invention, articles are produced which have surface layers in which the minor phase of the article is enriched with either yttrium or silicon.

9 Claims, 5 Drawing Figures

METHOD OF PRODUCING DENSE SILICON NITRIDE CERAMIC ARTICLES HAVING CONTROLLED SURFACE LAYER COMPOSITION

CROSS-REFERENCE TO RELATED APPLICATIONS

This application relates to matter disclosed and claimed in co-pending application Ser. No. 333,246 filed concurrently herewith and assigned to the present assignee.

BACKGROUND OF THE INVENTION

This invention relates to methods of producing densified composite ceramic articles. More particularly, it is concerned with a method of producing dense, polycrystalline silicon nitride articles having thin surface layers of controlled composition.

Densified composite ceramic articles based upon silicon nitride have been the subject of considerable study. Powder mixtures predominantly comprising silicon nitride, when consolidated to densities approaching the theoretical maximum, result in the production of densified ceramic articles having desirable high temperature properties. These articles have refractory character, high temperature creep resistance, thermal shock resistance, and strength which make them ideal for many high temperature applications.

To produce densified composite ceramics from powder mixtures, three methods of consolidation generally have been employed: hot pressing, hot isostatic pressing, and so-called pressureless sintering.

Hot pressing involves the simultaneous application of heat and mechanical pressure to the powder mixture at temperatures high enough to cause sintering. Typically, pressures of several tons per square inch are applied uniaxially to the powder mixture, usually by means of a ram press.

In the hot isostatic pressing method, the powder mixture is placed in a non-permeable deformable container to which heat and pressure are applied at temperatures high enough to cause sintering. In this method, the pressure is applied equally in all directions on the powder mixture, usually by means of a pressurized fluid.

Although sintering of the powder mixture occurs during both of the foregoing processes, the term "sintering" when used in connection with processes for densifying powder mixtures, generally connotes the process of densifying a pre-pressed powder compact without the aid of pressure applied external to the compact which drives the powder particles together.

Sintering is the preferred method of densifying composite ceramic articles because of both the cost and complexity of equipment needed for other methods and because of the difficulty of producing some intricately shaped ceramic articles by diamond grinding following hot pressing or hot isostatic pressing.

It is known in the art to add other materials to silicon nitride to aid in its sintering and to confer valuable high temperature properties upon the finished article. Densification aids which have been used for this purpose include aluminum oxide, magnesium oxide, yttrium oxide, and the oxides of the rare earth elements.

Although pressureless sintering of silicon nitride containing additives is an attractive process for producing densified composite ceramics, the method has some drawbacks. Decomposition or volatilization of silicon nitride or of other components of the initial powder mixture during sintering can often occur at the elevated temperatures required.

OBJECTS OF THE INVENTION

It is therefore an object of the present invention to provide an improved method of producing densified composite ceramic articles of silicon nitride by pressureless sintering.

It is another object of this invention to provide a method of producing densified composite ceramic articles of silicon nitride having surface layers of controlled composition.

SUMMARY OF THE INVENTION

It has been found in accordance with the present invention that dense, polycrystalline ceramic articles comprising a major phase consisting essentially of silicon nitride and a minor phase consisting essentially of silicon, nitrogen, oxygen, and yttrium, wherein the articles have thin surface layers of controlled composition, are produced by sintering powder compacts of silicon nitride, silicon dioxide, and yttrium oxide embedded in powdered setter bed mixtures of predetermined compositions different from the composition of the powder compact. In the method of this invention, careful selection of the composition of the setter bed powder mixture relative to that of the powder compact results in the production of dense, polycrystalline silicon nitride ceramic articles having uniform composition throughout or, alternatively, having surface layers in which the mole ratio of yttrium oxide to silicon dioxide in the minor phase differs from the corresponding ratio in the interior of the body of the article.

More particularly, in accordance with this invention, a method of producing dense, polycrystalline silicon nitride based articles having thin surface layers of controlled composition comprises the steps of (a) providing a finely divided mixture of silicon nitride, silicon dioxide, and yttrium oxide; (b) pressing the powder mixture to form a sinterable compact; (c) embedding the sinterable compact in a non-sinterable setter bed powder mixture of from about 48 mole percent to about 94 mole percent silicon nitride, the balance consisting essentially of yttrium oxide and silicon dioxide wherein the mole ratio of yttrium oxide to silicon dioxide is between zero and about 2; and heating the sinterable compact and non-sinterable setter bed powder mixture at a temperature and for a period sufficient to sinter the compact to a densified composite article having a density of at least 98% of theoretical.

For a better understanding of the present invention, together with other and further objects, advantages, and capabilities thereof, reference is made to the following disclosure and appended claims in connection with the above-described drawings.

DESCRIPTION OF THE PREFERRED EMBODIMENTS

Figure 1:
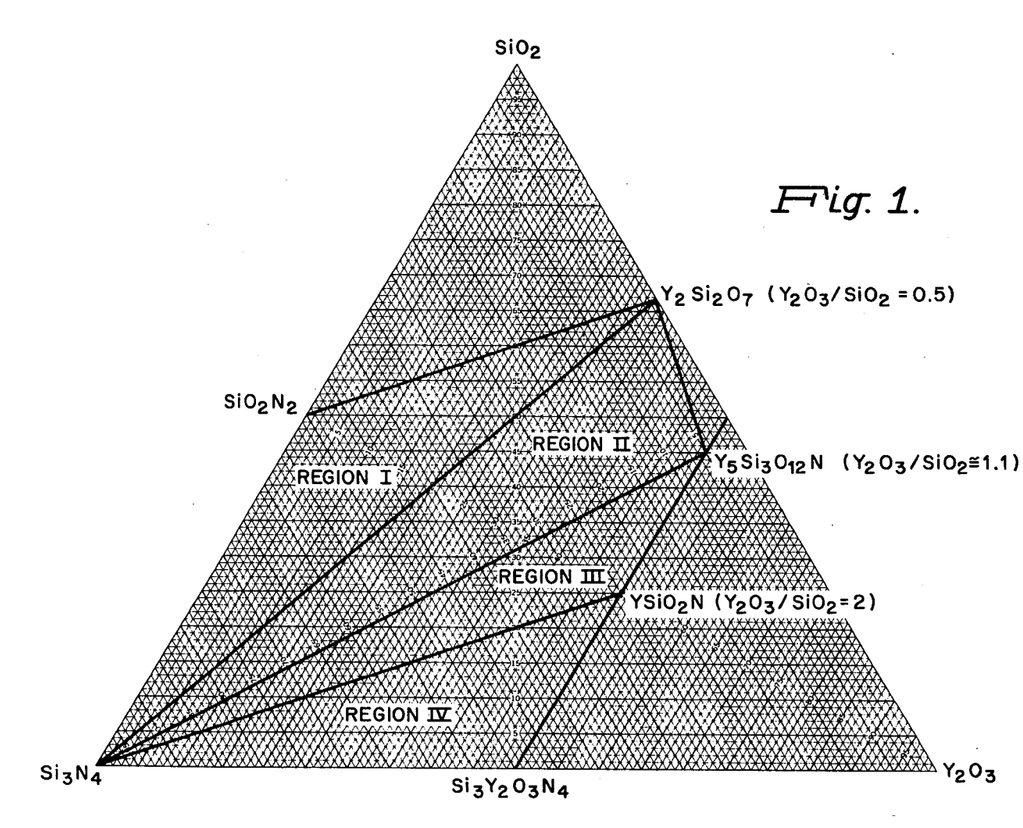
FIG. 1 is the triangular composition diagram of the silicon nitride-silicon dioxide-yttrium oxide system.

Referring to FIG. 1, there is shown the triangular mole fraction composition diagram for the silicon nitride-silicon dioxide-yttrium oxide system indicating the major compounds formed by the components of the system. Lines connecting the composition points of these compounds divide the diagram into several regions of interest which have been designated with Roman numerals.

It generally has been taught in the prior art that to fabricate ceramic compositions of silicon nitride, silicon dioxide, and yttrium oxide which are stable toward oxidation, the compositions must be restricted to regions I and II of the composition diagram. (See for example U.S. Pat. No. 4,102,698 to Lange et al.) This restriction arises due to the increasing inclusion of compounds such as $YSiO_2N$, unstable toward oxidation, in the final densified composite as the starting powder mixture contains increasing amounts of $Y_2O_3$. Thus, it has been taught in the prior art that, when formulating silicon nitride-silicon dioxide-yttrium oxide ceramics, compositions lying in regions III and IV of the ternary composition diagram shown in FIG. 1 are to be avoided.

However, in accordance with the method of this invention, it has been found that silicon nitride-silicon dioxide-yttrium oxide ceramic compositions which range over a wider permissible area of the $Si_3N_4$—$SiO_2$—$Y_2O_3$ composition diagram and which have surface layers tailored to increase their high temperature strength and/or oxidation resistance can be produced by sintering the powder compacts in a setter bed powder mixture of a composition different from that of the compact. The resulting composite ceramics possess thin surface layers in which the minor phase is enriched with respect to either silicon or yttrium. In the former instance, the surface layer possesses enhanced oxidation resistance over materials containing greater amounts of yttrium. In the latter instance, the surface layer possesses greater high temperature strength due to the inclusion of additional yttrium.

Thus, the method of the present invention permits the tailoring of a thin surface layer on sintered composite silicon nitride-silicon dioxide-yttrium oxide ceramics to meet the needs of particular applications. For example, a stronger ceramic body having yttrium oxide content which places it in one of the "undesirable" composition regions (III or IV) of the ternary composition diagram of FIG. 1, more prone to high temperature oxidation, may be tailored with an oxidation resistant casing layer enriched in silicon dioxide.

Conversely, for example, a more oxidation resistant ceramic body having a higher silicon dioxide content may be tailored with a stronger, yttrium oxide enriched surface layer using the method of this invention.

Figure 2:
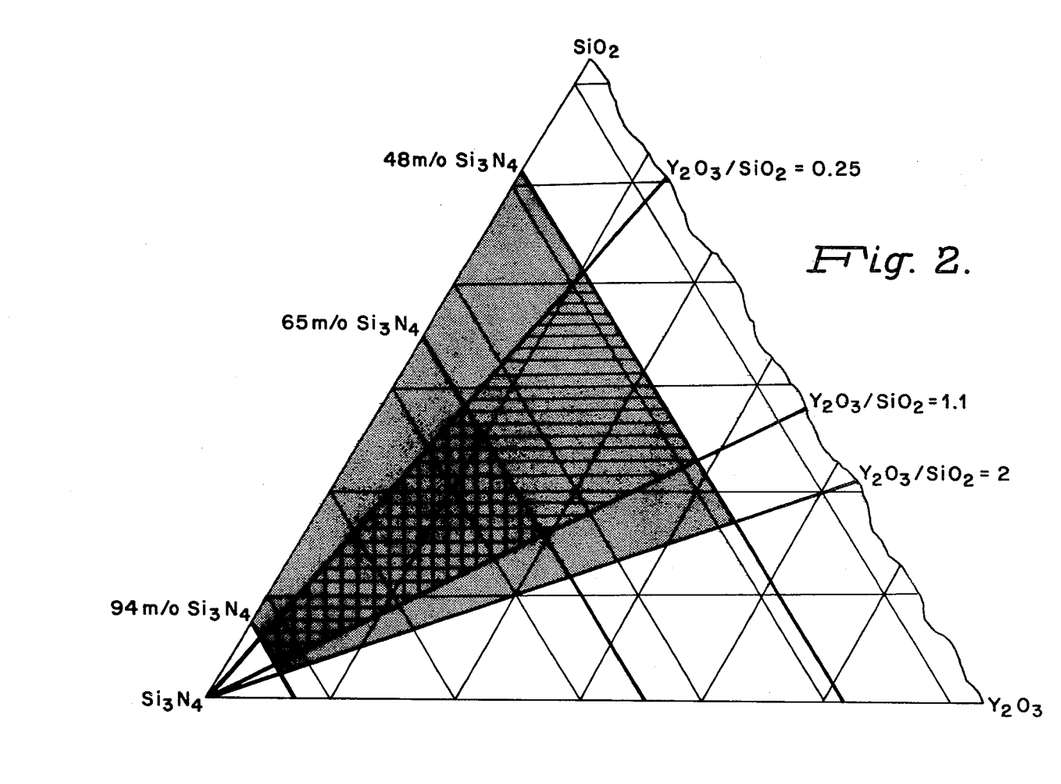
FIGS. 2 and 3 are of an enlarged portion of the composition diagram of FIG. 1.

Referring to FIG. 2, the workable range of setter bed powder compositions employed in the method of this invention lies in the shaded region of the ternary composition diagram shown there. That is, workable setter bed powder compositions of the method of this invention contain between about 48 mole percent and about 94 mole percent silicon nitride, with mole ratios of yttrium oxide to silicon dioxide lying between zero and about 2.

In a more preferred embodiment of the method of the present invention, the composition of the setter bed powder mixture lies in the horizontally barred region of the composition diagram shown in FIG. 2. That is, setter bed powder compositions of this preferred embodiment contain between about 48 mole percent and about 94 mole percent silicon nitride, with mole ratios of yttrium oxide to silicon dioxide lying between about 0.25 and 1.1.

In the most preferred embodiment of this invention, the compositions of the setter bed powders employed in the method contain between about 65 mole percent and about 94 mole pecent silicon nitride and have mole ratios of yttrium oxide to silicon dioxide between about 0.25 and 1.1.

In the first step of the method of this invention, a finely divided powder mixture is provided containing about 80 mole percent to about 95 mole percent silicon nitride, with the balance comprising silicon dioxide and yttrium oxide. The silicon nitride may be amorphous material, amorphous material which has been partially crystallized by heat treatment, or may be a mixture of substantially completely crystalline and substantially completely amorphous material. The average particle size of the material should range below about 3 microns, preferably below about 1 micron. A method of obtaining silicon nitride of the requisite purity, particle size and morphology has been described in detail in U.S. patent application Ser. No. 625,330, filed Oct. 23, 1975, assigned to the present assignee and now abandoned.

Silicon dioxide in amounts ranging between about 2 mole percent and about 10 mole percent of the starting powder mixture may be present as an oxide coating on the silicon nitride material, or may be added to pure silicon nitride or to silicon nitride having insufficient oxide in order to obtain the desired oxide composition.

Yttrium oxide in amounts of between about 2 mole percent and about 15 mole percent is added to the starting mixture of silicon nitride and silicon dioxide to act as a densification aid.

The powder mixture preferably contains less than 0.1 weight percent cation impurities, but may additionally contain small amounts (up to about 3 weight percent) of aluminum oxide or iron oxide to enhance sinterability.

In the second step of the method, the powder mixture is cold pressed at pressures of about 500 psi to about 25,000 psi to form the powder mixture into a sinterable compact.

In the third step of the method of this invention, the pressed powder compact is embedded in a setter bed powder mixture of silicon nitride, silicon dioxide, and yttrium oxide having a composition lying within the ranges detailed above. The materials employed for the formulation of the setter bed may be derived from the same sources as the materials used in formulating the powder compact.

In the next step of the method, the pressed compact and setter bed powder mixture are preferably heated in a nitrogen atmosphere to sinter the compact to a densified body having a density of at least 98% of theoretical, preferably greater than 99%. Sintering temperatures of between about 1400° C. and 2000° C. are chosen, depending upon the ease of sinterability of the particular compact composition chosen. Sintering times of between about 1 hour and 10 hours are effective to produce densified ceramic articles having densities in excess of 98% of theoretical.

It is preferred that the sintering step be carried out in a nitrogen gas atmosphere at a pressure which is proportional to the sintering temperature to inhibit volatilization or decomposition of the silicon nitride. It has been found in accordance with the method of this invention that nitrogen pressures useful in this step of the invention are related to the sintering temperature by the expression:

$$P = e^{[(-a/T)+b]}$$

where P is the pressure in atmospheres, T is the absolute temperature in degrees Kelvin, and a and b are constants having the values of about $2.9 \times 10^4$ and 15.43, respectively.

In one embodiment of the method of this invention, the composition of the setter bed powder is chosen so that the final sintered body has substantially uniform composition throughout. In this embodiment of the method, judicious selection of the setter bed powder composition relative to that of the pressed powder compact insures the dynamic balance between the setter bed and compact during sintering so that the surface layer of the final sintered body is substantially the same as that of the interior of the sintered body.

Since the article produced by this embodiment of the method has a surface layer of a composition which is substantially the same as that of the interior of the body of the article, it is preferred that the composition of the pressed sinterable compact lie within region I or II of the composition diagram of FIG. 1. That is, the composition of the compact preferably contains between about 80 mole percent to about 95 mole percent silicon nitride, between about 2 mole percent and about 10 mole percent silicon dioxide and between about 2 mole percent and about 15 mole percent yttrium oxide, but limited to compositions in which the molar ratio of yttrium oxide to silicon dioxide is equal to or less than about 1.0.

Specifically, in accordance with this embodiment, the molar amount of silicon nitride in the setter bed is chosen to be between about 0.6 and 0.9 times the molar amount of silicon nitride in the powder compact. The molar ratio of yttrium oxide to silicon dioxide in the setter bed powder is chosen to have a value between about 0.35 times the corresponding ratio in the powder compact, or any value up to that equal to the molar ratio of yttrium oxide to silicon dioxide in the powder compact.

Figure 3:
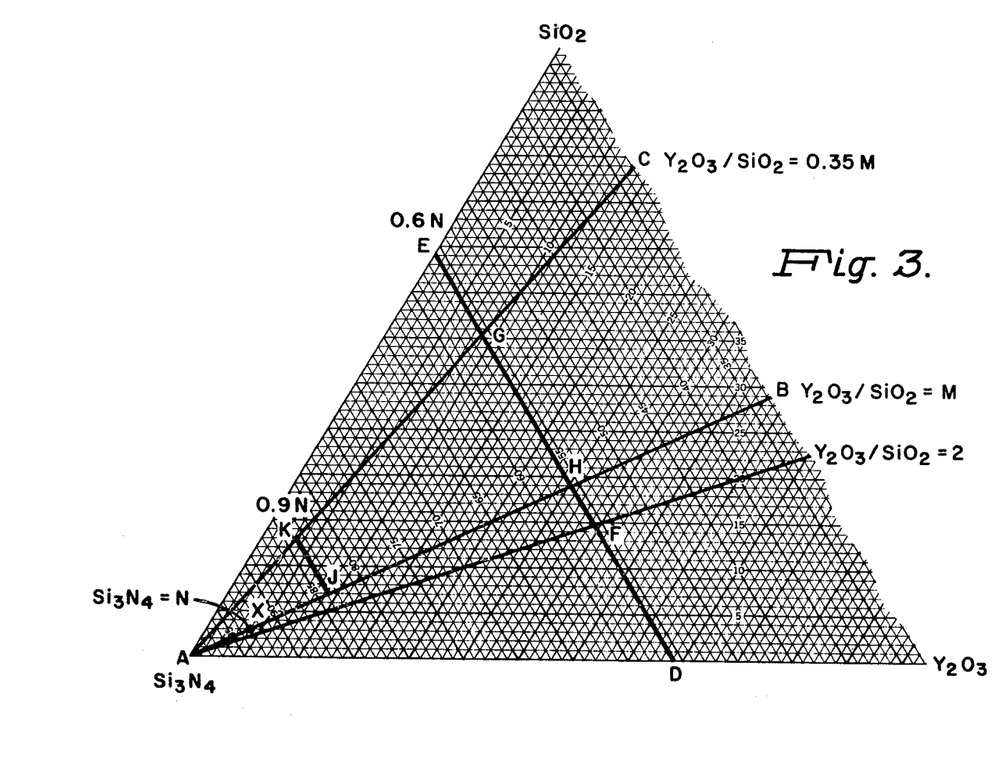

These preferred setter bed powder compositions for this embodiment of the method can best be visualized by reference to FIG. 3. However, in the discussion which immediately follows, it is to be understood that the composition represented by point X in the composition diagram of FIG. 3 and the lines drawn in that Figure representing molar ratios of yttrium oxide to silicon dioxide are merely for illustrative purposes and are not to be read as limiting the scope of the invention as claimed in the appended claims.

In the ternary composition diagram shown there, point X represents the composition of the powder compact. All points lying along the line AXJHB have the same molar ratio of yttrium oxide to silicon dioxide, represented by the value M. Points lying along the line AKGC represent compositions having a molar ratio of yttrium oxide to silicon dioxide of about 0.35 times that of composition X, that is, 0.35 M. Line EGHFD represents the iso-composition line where the molar amount of silicon nitride is about 0.6 times that of composition X, while line KJ represents the iso-composition line where the molar amount of silicon nitride is about 0.9 times that of composition X.

To sinter composition X to a final densified ceramic body having substantially uniform composition throughout by the method of this embodiment of the invention, the setter bed powder composition should preferably lie in the quadrilateral region GHJK of FIG. 3.

Figure 4:
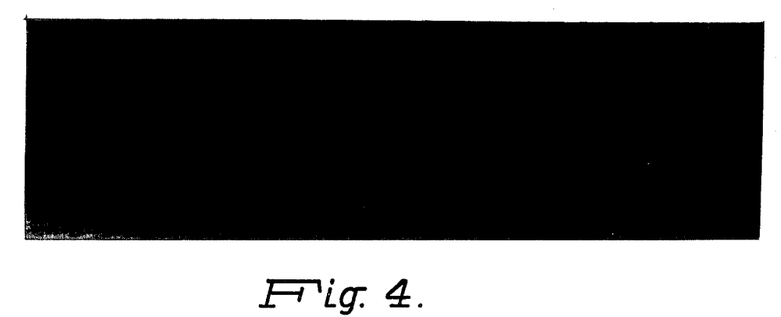
FIGS. 4 and 5 are photomicrographs of cross-sections of densified silicon nitride ceramic articles made in accordance with the method of this invention.

FIG. 4 is a photomicrograph of a cross-section of a sintered ceramic body of silicon nitride, silicon dioxide and yttrium oxide made in accordance with this embodiment of the present method (see Example 1 below). Electron microprobe analysis across the exposed cross-sectional face of this sample indicated no detectable variation in the silicon or yttrium content.

In another embodiment of the method of this invention, the composition of the setter bed powder mixture is chosen relative to that of the pressed compact to produce final sintered densified bodies in which the molar ratio of yttrium oxide to silicon dioxide in the minor phase of the surface layer is less than that in the second intergranular phase of the interior of the body.

Referring again to FIG. 3, to sinter a pressed compact having a hypothetical composition represented by point X of FIG. 3 to a final densified body having a silica rich surface layer, setter bed powder compositions lying in the triangular region AEG are employed. That is, in accordance with this embodiment of the invention, the setter bed powder should contain a molar amount of silicon nitride at least 0.6 times that in the powder compact, that is, 0.6 N. The mole ratio of yttrium oxide to silicon dioxide in the setter bed powder should be less than 0.35 times the corresponding molar ratio in the powder compact.

In yet another embodiment of the method of this invention, the composition of the setter bed powder mixture is chosen relative to that of the pressed powder compact to produce final sintered densified bodies in which the molar ratio of yttrium to silicon in the minor phase of the surface layer of the body is greater than that in the second intergranular phase of the interior of the body.

In this embodiment of the method, to sinter a powder compact having the composition represented by point X of FIG. 3, the setter bed powder mixture preferably has a composition lying within triangular region AFH of the composition diagram. That is, preferred setter bed powder mixtures of this embodiment contain a molar amount of silicon nitride of at least about 0.6 times that of the compact, that is, 0.6 N. The mole ratio of yttrium oxide to silicon oxide in the setter bed powder ranges between a value greater than that of the compact (line AJHB) up to a value of about 2 (line AF).

Figure 5:
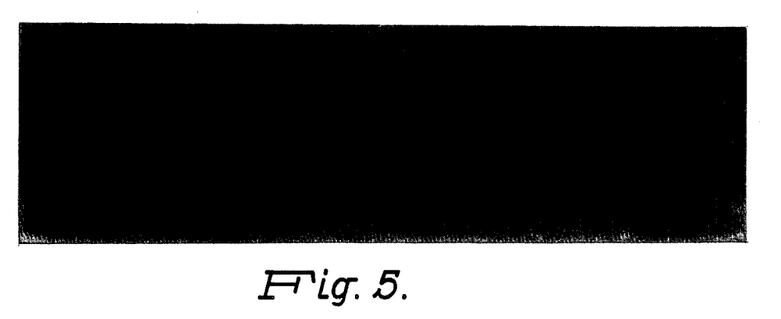

FIG. 5 is a photomicrograph of a cross-section of a silicon nitride-silicon dioxide-yttrium oxide ceramic composite article made in accordance with this embodiment of the method (see Example 4 below). Examination of FIG. 5 clearly shows the yttrium-rich casing layer produced in the article by this fabrication method. An electron microprobe analysis across the exposed face of the cross-section indicated substantially the same silicon content in both the surface layer and the interior of the article with considerably enhanced yttrium content in the surface layer.

EXAMPLES

To enable one skilled in the art to practice the method of the present invention, the following examples are provided. The examples are merely illustrative of the invention and are not to be viewed as limiting the scope of the invention as defined by the appended claims.

tering process to produce an yttria-rich casing layer on the article.

TABLE I

| EXAMPLE | MOLAR COMPOSITION OF COMPACT | | | | MOLAR COMPOSITION OF SETTER BED | | | | J Ratio Column H Column D | K Ratio Column E Column A |
|---|---|---|---|---|---|---|---|---|---|---|
| | A Si$_3$N$_4$ | B SiO$_2$ | C Y$_2$O$_3$ | D Mole Ratio Y$_2$O$_3$/SiO$_2$ | E Si$_3$N$_4$ | F SiO$_2$ | G Y$_2$O$_3$ | H Mole Ratio Y$_2$O$_3$/SiO$_2$ | | |
| 1 | 93.0 | 3.20 | 3.80 | 1.19 | 80.0 | 14.0 | 6.0 | 0.43 | 0.36 | 0.86 |
| 2 | 93.2 | 2.96 | 3.80 | 1.28 | 77.8 | 12.8 | 9.4 | 0.74 | 0.58 | 0.83 |
| 3 | 90.7 | 6.80 | 2.50 | 0.37 | 93.2 | 6.8 | 0 | 0 | 0 | 1.03 |
| 4 | 93.0 | 3.20 | 3.80 | 1.19 | 93.0 | 3.2 | 3.8 | 1.19 | 1.00 | 1.00 |
| 5 | 93.2 | 2.96 | 3.80 | 1.28 | 72.2 | 2.8 | 25.0 | 9.03 | 7.05 | 0.77 |
| 6 | 84.8 | 7.0 | 8.2 | 1.17 | 84.8 | 7.0 | 8.2 | 1.17 | 1.00 | 1.00 |
| 7 | 88.3 | 3.5 | 8.2 | 2.34 | 88.3 | 3.5 | 8.2 | 2.34 | 1.00 | 1.00 |

Unless otherwise indicated, all percentages are mole percent.

In each of the Examples 1–7 below, a mixture of silicon nitride, silicon dioxide, and yttrium oxide was thoroughly mixed by conventional ball milling methods. The mixture was then pre-pressed to form a compact which had the compositions indicated in Table I.

In each case, the pressed compact was embedded in a setter bed powder having the composition given in Table I, and sintered for 1 hour at 1400° C. and then for 4 hours at 1900° C. under nitrogen gas at a pressure of about 200 psi.

Table I further indicates the molar ratio of yttrium oxide to silicon dioxide in each pressed compact (column D of the Table) and in the setter bed powder (column H of the Table).

The ratio of yttria to silica in the setter bed relative to that in the pressed compact for each example is given in column J of the Table, while the ratio of silicon nitride in the setter bed to that in the pressed compact appears in column K of the Table.

Examples 1 and 2 of Table I represent articles having substantially uniform composition throughout, made in accordance with the first specific embodiment of the method of this invention discussed above. The cross-section of the article corresponding to Example 1 is shown in FIG. 4 and has already been discussed above. As can be seen by the data presented in Table II, the final density (3.265 g/cm$^3$) of the article corresponding to Example 2 is very close to the theoretical density (3.261 g/cm$^3$) of a pure silicon nitride-silicon dioxide-yttrium oxide article. The corresponding small gain in weight (about 0.86%) of the article after sintering indicates little, if any, incorporation of material from the setter bed powder during the sintering process.

Example 3 represents an article made in accordance with the second specific embodiment of the present method in which the resulting article possesses a silica-rich casing layer.

Examples 4–7 represent articles made in accordance with the third specific embodiment of the present method which results in an article having an yttria-rich casing layer. The cross-section of the article corresponding to Example 4 appears in FIG. 5 and has already been discussed above. As can be seen from the data in Table II, the density of the article corresponding to Example 6 has a density (3.455 g/cm$^3$) considerably greater than that (3.261 g/cm$^3$) of a pure silicon nitride-silicon dioxide-yttrium oxide article. The diminished shrinkage (about 21%) and higher weight gain (about 25.42%) upon sintering indicate that this article has incorporated yttria from the setter bed during the sintering process to produce an yttria-rich casing layer on the article.

TABLE II

| | SINTERING BEHAVIOR | | |
|---|---|---|---|
| EXAMPLE | WEIGHT CHANGE | % VOLUME SHRINKAGE | DENSITY (g/cm$^3$) |
| 2 | +0.86% | −32.25 | 3.265 |
| 6 | +25.42% | −21.00 | 3.455 |

Thus, in accordance with the present invention, a method is provided for producing sintered composite ceramic bodies of silicon nitride, silicon dioxide, and yttrium oxide in which the body has substantially uniform composition throughout or, alternatively possesses a silica-rich or yttria-rich casing layer.

While there have been shown and described what are at present believed to be the preferred embodiments of the present invention, it will be obvious to one skilled in the art that various changes and modifications may be made therein without departing from the scope of the invention as defined by the appended claims.

What is claimed is:

1. A method of producing dense, polycrystalline silicon nitride articles having surface layers of controlled composition comprising the steps of:
    (a) providing a finely divided mixture of from about 80 mole percent to about 95 mole percent silicon nitride, from about 2 mole percent to about 10 mole percent silicon dioxide and from about 2 mole percent to about 15 mole percent yttrium oxide;
    (b) pressing the mixture to form a sinterable compact;
    (c) embedding the sinterable compact in a non-sinterable setter bed powder mixture of a composition different from that of the powder compact, with a content of from about 48 mole percent to about 94 mole percent silicon nitride, the balance consisting essentially of yttrium oxide and silicon dioxide wherein the mole ratio of yttrium oxide to silicon oxide is between 0 and about 2; and
    (d) heating the sinterable compact and nonsinterable setter bed powder mixture at a temperature and for a period sufficient to sinter the compact to a densified composite article having a density of at least 98% of theoretical, wherein said step of heating is carried out in a nitrogen atmosphere at a pressure which is related to the temperature of heating by the expression:

$$P = e^{[(-a/T)+b]}$$

where P is the pressure in atmospheres, T is the absolute temperature in degrees Kelvin, and a and b are constants which have the values of about $2.9 \times 10^4$ and about 15.43, respectively, to substantially inhibit the thermal decomposition and volatilization of silicon nitride at said temperature.

2. A method in accordance with claim 1 wherein the mole ratio of yttrium oxide to silicon dioxide in said setter bed powder mixture ranges between about 0.25 and about 1.1.

3. A method in accordance with claim 2 wherein the molar amount of silicon nitride present in said setter bed powder mixture is between about 65 mole percent and about 94 mole percent.

4. A method of producing a dense, polycrystalline silicon nitride based article having substantially uniform composition throughout comprising the steps of:
   (a) providing a finely divided mixture of silicon nitride, silicon dioxide, and yttrium oxide;
   (b) pressing the mixture to form a sinterable compact;
   (c) embedding the sinterable compact in a nonsinterable setter bed powder mixture of a composition different from that of the powder compact, with a content consisting essentially of silicon nitride, yttrium oxide, and silicon dioxide wherein the molar amount of silicon nitride in said setter bed powder mixture ranges between about 0.6 and 0.9 times the molar amount of silicon nitride in said sinterable compact, and wherein the molar ratio of yttrium oxide to silicon dioxide in said setter bed powder mixture ranges between about 0.35 and 1.0 times the molar ratio of yttrium oxide to silicon dioxide in said sinterable compact; and
   (d) heating the sinterable compact and non-sinterable setter bed powder mixture at a temperature and for a period sufficient to sinter said compact to a densified composite article having a density at least 98% of theoretical, wherein said step of heating is carried out in a nitrogen atmosphere at a pressure which is related to the temperature of heating by the expression:

$$P = e^{[(-a/T)+b]}$$

where P is the pressure in atmospheres, T is the absolute temperature in degrees Kelvin, and a and b are constants which have the values of about $2.9 \times 10^4$ and about 15.43, respectively, to substantially inhibit the thermal decomposition and volatilization of silicon nitride at said temperature.

5. A method in accordance with claim 4 wherein said sinterable compact comprises between about 80 mole percent and about 95 mole percent silicon nitride, less than about 10 mole percent silicon dioxide, with the balance consisting essentially of yttrium oxide, providing that the molar ratio of yttrium oxide to silicon dioxide is less than about 1.0.

6. A method of producing a dense, composite, polycrystalline silicon nitride based article comprising a major phase consisting essentially of silicon nitride and a minor phase consisting essentially of silicon, nitrogen, oxygen and yttrium, said article having a thin surface layer wherein the molar ratio of yttrium to silicon in said minor phase is less than the molar ratio of yttrium oxide to silicon dioxide in said minor phase in the interior of the body of said article, said method comprising the steps of:
   (a) providing a finely divided mixture of silicon nitride, silicon dioxide, and yttrium oxide;
   (b) pressing the mixture to form a sinterable compact;
   (c) embedding the sinterable compact in a setter bed powder mixture of a composition different from that of the power compact, with a content consisting essentially of silicon nitride, silicon dioxide, and yttrium oxide wherein the molar amount of silicon nitride in said setter bed powder mixture is greater than about 0.6 times the molar amount of silicon nitride in said sinterable compact and wherein the molar ratio of ytrrium oxide to silicon dioxide in said setter bed powder mixture is less than about 0.35 times the molar ratio of yttrium oxide to silicon dioxide in said sinterable compact; and
   (d) heating the sinterable compact and non-sinterable setter bed powder mixture at a temperature and for a period sufficient to sinter said compact to a densified composite article having a density at least 98% of theoretical, wherein said step of heating is carried out in a nitrogen atmosphere at a pressure which is related to the temperature of heating by the expression:

$$P = e^{[(-a/T)+b]}$$

where P is the pressure in atmospheres, T is the absolute temperature in degrees Kelvin, and a and b are constants which have the values of about $2.9 \times 10^4$ and about 15.43, respectively, to substantially inhibit the thermal decomposition and volatilization of silicon nitride at said temperature.

7. A method in accordance with claim 6 wherein said sinterable compact comprises from about 80 mole percent to about 95 mole percent silicon nitride, from about 2 mole percent to about 10 mole percent silicon dioxide, and from about 2 mole percent to about 15 mole percent yttrium oxide.

8. A method of producing a dense, composite, polycrystalline silicon nitride based article comprising a major phase consisting essentially of silicon nitride and a minor phase consisting essentially of silicon, nitrogen, oxygen, and yttrium, said article having a thin surface layer wherein the molar ratio of yttrium to silicon in said minor phase is greater than the molar ratio of yttrium to silicon in said minor phase in the interior of the body of said article, said method comprising the steps of:
   (a) providing a finely divided mixture of silicon nitride, silicon dioxide, and yttrium oxide;
   (b) pressing the mixture to form a sinterable compact;
   (c) embedding the sinterable compact in a setter bed powder mixture of a composition different from that of the powder compact, with a content consisting essentially of silicon nitride, silicon dioxide, and yttrium oxide wherein the molar amount of silicon nitride in said setter bed powder mixture is greater than about 0.6 times the molar amount of silicon nitride in said sinterable compact and wherein the molar ratio of yttrium oxide to silicon dioxide in said setter bed powder mixture is greater than about 1.0 times the molar ratio of yttrium oxide to silicon dioxide in said sinterable compact, but less than about 2.0; and
   (d) heating the sinterable compact and non-sinterable setter bed powder mixture at a temperature and for a period sufficient to sinter said compact to a densified composite article having a density at least 98% of theoretical, wherein said step of heating is carried out in a nitrogen atmosphere at a pressure which is related to the temperature of heating by the expression:

$$P = e^{[(-a/T)+b]}$$

where P is the pressure in atmospheres, T is the absolute temperature in degrees Kelvin, and a and b are constants which have the values of about $2.9 \times 10^4$ and about 15.43, respectively, to substantially inhibit the thermal decomposition and volatilization of silicon nitride at said temperature.

9. A method in accordance with claim 6 wherein said sinterable compact comprises from about 80 mole percent to about 95 mole percent silicon nitride, from about 2 mole percent to about 10 mole percent silicon dioxide, and from about 2 mole percent to about 15 mole percent yttrium oxide.

* * * * *